(12) United States Patent
Robinson

(10) Patent No.: US 7,595,455 B2
(45) Date of Patent: Sep. 29, 2009

(54) KENNY CLAMP

(75) Inventor: Wayne H. Robinson, 671 Teton Dr., Lothian, MD (US) 20711

(73) Assignee: Wayne H. Robinson, Lothian, MD (US)

( * ) Notice: Subject to any disclaimer, the term of this patent is extended or adjusted under 35 U.S.C. 154(b) by 170 days.

(21) Appl. No.: 10/078,430

(22) Filed: Feb. 21, 2002

(65) Prior Publication Data

US 2003/0155147 A1    Aug. 21, 2003

(51) Int. Cl.
    *H02G 3/18* (2006.01)
(52) U.S. Cl. ............................ 174/655; 174/78; 174/51; 174/650; 439/98; 439/99
(58) Field of Classification Search .................. 174/65, 174/78, 51, 65 R, 79 R, 151, 50, 53, 58, 57, 174/650, 652, 664, 68.1, 19, 21 R, 68.3, 135, 174/74 R, 665, 655, 656, 663; 439/98, 99; 138/96 T, 177, 103, DIG. 11; 285/333, 390, 285/355, 93, 19, 20
See application file for complete search history.

(56) References Cited

U.S. PATENT DOCUMENTS

| | | | | |
|---|---|---|---|---|
| 1,864,292 A | * | 6/1932 | Buchanan | 439/777 |
| 2,704,357 A | * | 3/1955 | Johnson | 174/151 |
| 3,567,843 A | * | 3/1971 | Collins et al. | 174/51 |
| 3,890,831 A | * | 6/1975 | Cusick et al. | 73/588 |
| 4,151,363 A | * | 4/1979 | Nichols | 174/65 R |
| 4,496,791 A | * | 1/1985 | Reichert et al. | 174/51 |
| 4,623,204 A | * | 11/1986 | Auclair | 439/100 |
| 4,900,066 A | * | 2/1990 | Brammer et al. | 285/92 |
| 5,013,872 A | * | 5/1991 | Lockwood et al. | 174/663 |
| 5,215,336 A | * | 6/1993 | Worthing | 285/319 |
| 5,406,032 A | * | 4/1995 | Clayton et al. | 174/151 |
| 5,594,202 A | * | 1/1997 | Tobias | 174/48 |
| 5,600,094 A | * | 2/1997 | McCabe | 174/65 SS |
| 5,763,832 A | * | 6/1998 | Anselm | 174/135 |
| 5,912,434 A | * | 6/1999 | Robinson | 174/51 |
| 5,939,676 A | * | 8/1999 | Birmingham et al. | 174/656 |
| 6,087,584 A | * | 7/2000 | Daoud | 174/50.59 |
| 6,180,882 B1 | * | 1/2001 | Dinh | 174/655 |

* cited by examiner

*Primary Examiner*—Angel R. Estrada

(57) ABSTRACT

An improved device for bonding a grounding electrode conductor to the enclosure of an electric service box comprising a grounding electrode conductor and a two part tapered metal sleeve connector assembly into which the conductor is inserted. A threaded fitting extends over the sleeve and a nut compresses the fitting and sleeve around the grounding electrode conductor. Both the conductor and the connector assembly are designed in conformance to the 2002 National Electric Code and the UL's Laboratory Manuals for connectors and grounding equipment.

6 Claims, 2 Drawing Sheets

KENNY CLAMP

FIELD OF INVENTION

This invention relates to an improved Kenny Clamp. Presently there is a U.S. Pat. No. 5,912,434, titled Kenny Clamp. This patent is soon to be supersded by Reissue application Ser. No 09/614,707, filed on Jul. 12, 2000. Basically the Kenny Clamp is a device fashioned to bond a grounding electrode conductor to the enclosure of an electric service box, other electrical enclosures, or separately devised systems in accordance with the requirements of the 2002 National Electric Code and is particularly useful in household, commercial and industrial wiring. While the Kenny Clamp as is, has met with considerable success, the improved Kenny Clamp is simpler and more economical to manufacture.

BACKGROUND OF THE INVENTION

As aforementioned, the 2002 National Electric Code Article 110.3 requires: examination, identification, installation and use of equipment, to be tested for its particuilar installation requirements such as mechanical strength, durability, beating effects, arching effects and other factors for practical safeguarding of persons using or likely to come in contact with such equipment.

In order to meet these requirements, equipment manufactured for the electrical industry must be lested and labeled by a recognized testing laboratory. Without this product listing and labeling, products would be deemed unacceptable. UL(Underwriters Laboratory) has long been recognized world wide as a leader in testing products in accordance with ANSI/UL. Standards applied to the "Improved Kenny Clamp" are UL486A, that is, pertaining to wire connerctors and soldering lugs for use with Copper Conductors and UL 467 that relates to grounding and bonding equipment.

One such test is the mechanical strength test which requires a tightening force of 150 pound inches applied to each product sample, for example the Improved Kenny Clamp.

Another test used is the short-time test wherein electrical currents are applied to a product such as the grounding electrode conductor. The test current is determined by the largest AWG wire the product is labeled for. A 3/0 conductor wire requires 8030 amperes applied for 9 seconds. Under this test the wire fitting shall not crack, break or melt.

A third test is protection against corrosion. Unless the metal used for the Improved Kenny Clamp as well as the grounding electrode conductor is inherently corrosion resistant, such as a non-ferrous metal like copper or aluminum, the grounding product must be protected by a zinc or cadmium coating at least 0.001 inch (0,025 mm) thick.

Typically the grounding electrode conductor is fastened to a water pipe and extends through an opening in a service box or enclosure where it is fastened to a bus bar by means of a screw.

Exemplary of prior art ground connectors are as follows:

U.S. Pat. No. 2,704,357 shows a jack comprising an insulated mounting sheath cylindrical in shape Within the sheath is a contact made of a conducting material such as steel. which may be coated with silver. The contact is made of two resilient, tapered bifurcated portions. Rearwardly thereof is a reduced portion followed by an anchoring and sealing means inserted into the sheath and a terminal contact to which is soldered a contact wire.

U.S. Pat. No. 2,710,381 pertains to a device for bonding an electric ground wire to an electric outlet or switch box. This apparatus employs a grounding coupling or wedge wherein the electric wire connected to the box is placed in a groove and a stud screwed down upon it. A pin having contact with the ground wire also makes contact with the electric outlet box.

U.S. Pat. No. 3,009,128 teaches a coupling nut provided with a terminal connector for use in grounding equipment (not specified). The problem that was solved was to make coupling nuts such as 23 accessible. Heretofore the coupling nut was attached in such a way that after it was in place within a service box as 22, terminal connectors such as 21 were inaccessible. or very difficult to access. In the invention the the coupling nut is cylindrical, has internal threads for threading to a conduit that projects into the service box. The terminal is mounted outside the fitting and has an opening tbrugh which a ground wire can be inserted from equipment within the box into a through passageway 17 and then fixing the wire with a set screw to obtain good electrical connection.

U.S. Pat. No. 4,145,566 illustrates a housing for electrical devices that is formed with an axial bore that tapers toward an inlet opening. Within the housing are pressure members which comprise frustoconical elements which are deflected radially when sliding up on the inner oblique surface of the housing to clamp the cable therebetween. The pressure member is shifted axially by threaded tightening of the cable bushing.

U.S. Pat. No. 4,151,363 depicts a method and apparatus for joining electrical conductors to junction boxes. In operation a ring nut is passed over a threaded stem made of four flared, threaded projections. An insulated conductor is then passed through the opening defined by the four projections that pass through the service box. The ring nut is then advanced drawing the projections inwardly and clamping the projection surfaces agains an insulation cover that extends over the insulated conductors. The stem is then held in place by tightening down on the nut within the service box.

U.S. Pat. No. 4,209,661 is another example of a clamping device for securing an electrical conductor in a service box. The conductors are of the type carrying an insulating jacket. The clamp is an elongated wedge having at one end a bifurcation which defines a plurality of codirectionally, extending parallel legs at one end. The legs have a plurality of teeth which continue all the way to the free ends of the two legs. The teeth engage both the box and the conductor bybiting or mechanically engaging both box and conductor.

U.S. Pat. No. 4,496,791 depicts a spring biased connector for electrically bonding a device to a supporting wall. A flanged bushing is threaded into a push button housing mounted on a metal wall. A serrated spring is located between the flange of the bushing and the metal wall so that when the threaded fastener engages the bushing the spring is deflected into the wall and completes an electric circuit. This type of connection obviates the use of a ground connection wire.

U.S. Pat. No. 5,594,202 shows a split sleeve system that provides a casing for wires and cables passing through a wall. or floor. The sleeve system can be used regardless of whether the wiring has already been installed. A pair of mating sleeves are inserted around the cables through the wall or floor, and slotted flanges are placed adjacent the outside of the wall for tightly retaining the sleeves in place. Both flanges and sleeves have mating threads.

U.S. Pat. No. 5,912,434 is drawn to the original Kenny Clamp patent. This clamp differs from most of the other aforesaid patents in that both the clamp and the conductor are in electrical contact. In most of the other patents, the clamp engages an insulated conductor. The exceptions are U.S. Pat. No. 2,710,381, wherein an uninsulated section of wire makes contact with the electric outlet box, U.S. Pat. No. 3,009,128 wherein a ground wire is inserted from the equipment in the service box through a passageway in the block of the terminal connector and then fastened with a set screw, and U.S. Pat. No. 4,496,791 that uses a spring biased connector for electrically bonding a device to a supporting wall. However, the clamping means in these patents are structurally different from the clamping means of the Kenny Clamps of either the patent or this application, and there is no indication that the connections are in conformance with the 2002 National Electric Code, which stipulates that a grounding electrode conductor entering a panel board, must be bonded to a metallic surface and must be connected to a grounding electrode, for example a metal water pipe or a metal rod driven in to the earth. U.S. Pat. No. 2,710,381 bonds an electric wire to a metallic box but shows no connection to a grounding electrode. U.S. Pat. No. 3,009,128 uses a ground wire inserted from the equipment in the service box through a passageway in the block of the terminal connector, but no grounding electrode. In U.S. Pat. No. 4,496,791 the spring jumper might be likened to a grounding electrode conductor and the conductive wall might be a grounding electrode; however, an additional element such as the push button that is also considered to be a grounding conductor. In any event the conductive wall would not satisfy the code as a grounding electrode. As defined in the Code, (Article 100, pg 70-29), "Grounding Conductor is a conductor used to connect equipment or the grounded circuit of a wiring system to a grounding electrode or electrodes, that is the push button mentioned above is the grounding conductor. The "Grounding Electrode Conductor" is the conductor used to connect the grounding electrode to the equipment grounding conductor, to the grounded conductor or to both as in U.S. Pat. No. 5,912,434, its ReIssue or the present application. The grounding electrode conductor as defined herein provides a low impedance path for service equipment and conductors during fault conditons, short circuits or ground faults; moreover, the grounding electrode conductors as in U.S. Pat. No. 4,496,791 use sizes that do not encompass such a range as #8 through #3/0 wire and are not designed to be independent of the carrying current.

With regard to the other patents, while there is some similarities with regard to the clamping means, the clamping means itself is not in electrical contact with the conducting element.

Under normal conditions electricity seeks to return to its source and complete a continuous circuit. This return path is often provided by white neutral wires that return current to the main service panel. A grounding electrode conductor provides an additional return path for its electrical current. The grounding electrode conductor is a safety feature. As stated above, it is designed to conduct electricity to its source if current seeks to return to the service panel along a path other than the neutral wire.

Even if the ground wires of the pertinent patents cited above, namely, U.S. Pat. Nos. 2,704,357, 3,009,128, 4,496, 791 were to be considered grounding electrode conductors they would not satisfy the Code or dimensioned to meet grounding electrode conductor sizes shown in Table 250-66, pg. 107, 2002 of the National Electric Code. The fact is that none of the grounding wires or connectors is designed or rated to handle an excessive amount of fault current, for example in excess of 10,000 amperes in domestic households, for an extended period of time. This point is significant for the reason,that if there should be a failure in the circuit, and an excessive amount of current is dumped onto the ground wire, such wire would not be able to control the situation.

Accordingly it is an object of this invention to use a grounding electrode conductor to be connected to a panel board that conforms to the 2002 National Electrical Code.

It is another object of this invention to use a grounding electrode conductor that is sized, rated and designed to complete the circuit for operation of the fuse, circuit breaker or other current carrying devices under contrary conditions.

It is also an object of this invention to facilitate the securement of the grounding electrode conductor to the panel board by use of a simple clamp.

It is still an object of this invention to facilitate the securement or adequate strain relief of the grounding electrode conductor by a simple two piece clamp that is simpler and more economical to manufacture than the present Kenny Clamp.

SUMMARY OF THE INVENTION

An improved Kenny Clamp comprising a grounding electrode conductor and a two part metal press sleeve connector assembly into which the conductor is inserted. The connector is mounted on a panel board. Both the connector and the grounding electrode conductor are designed in accordance with the 2002 National Electric Code and the Underwriter's Laboratory Manuals for connectors and grounding equipment.

DETAILED DESCRIPTION OF THE INVENTION

Figure 1:
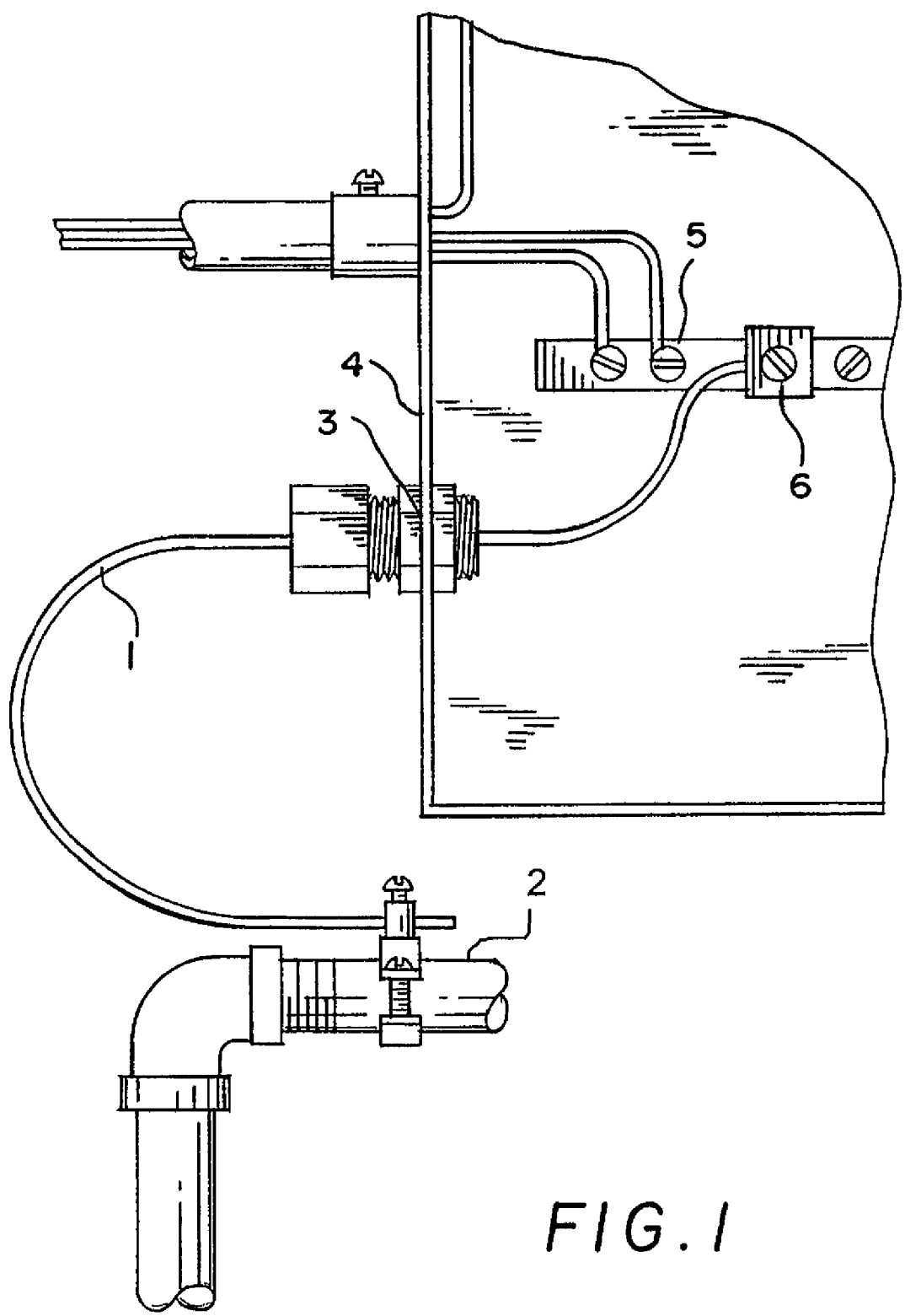
FIG. 1 is a front section showing the assembly of the grounding electrode conductor to the Improved Kenny Clamp of the invention in the panel board.
Figure 2:
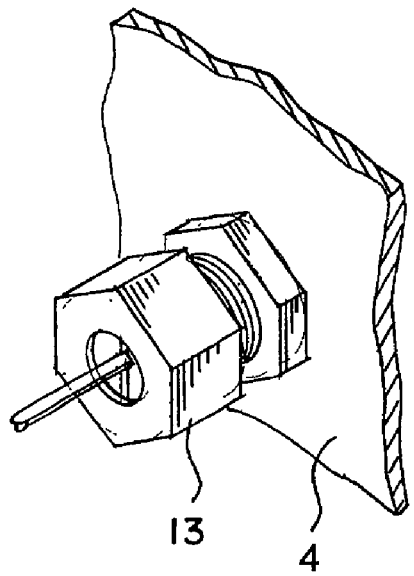
FIG. 2 is an enlarged view of the grounding electrode conductor assembly connected with Improved Kenny Clamp to the panel board.
Figure 3:
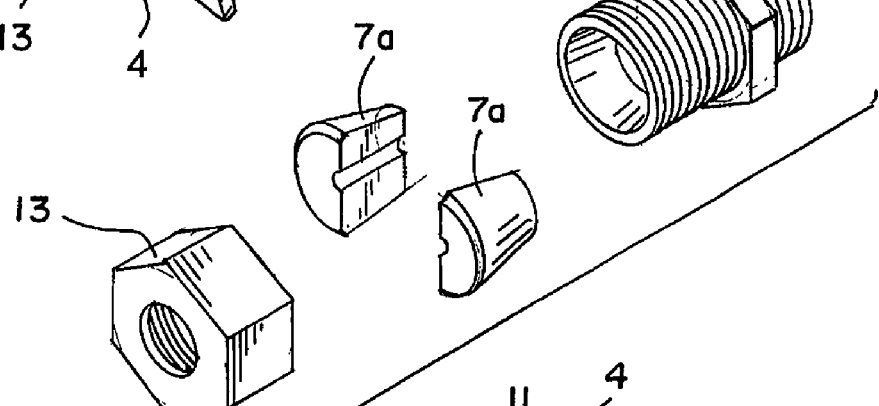
FIG. 3 is a view showing the elements of the Improved Kenny Clamp
Figure 4:
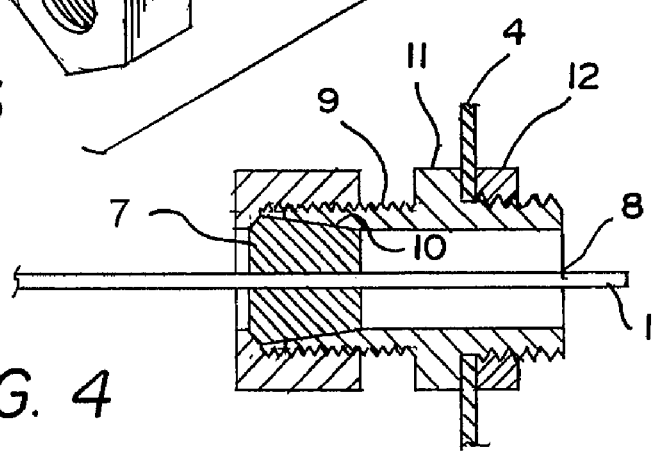
FIG. 4 is a sectional view showing the assembled elements of the Improved Kenny Clamp with the grounding electrode conductor connected to the panel board.
Figure 5:
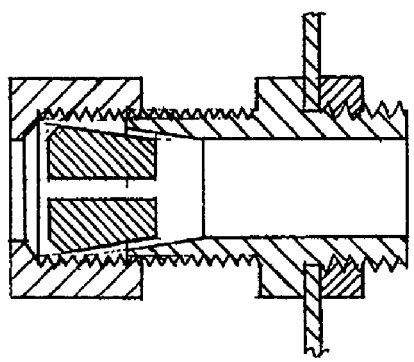
FIG. 5 is a sectional view of the assembled elements of the Improved Kenny Clamp without the conductor.

FIG. 1 shows the assembly of grounding electrode conductor 1 connected to a grounding electrode 2 such as a water pipe. The grounding electrode extends through an inlet 3 of the panel board 4 and terminates in a bus bar 5 secured by screws 6. The conductor is secured to the panel board by the Improved Kenny Clamp 7. This clamp or connector is a two part, flared, press sleeve, wherein each part 7a is as shown in FIG. 3a, separate and detached before assembly, is of equal dimension and tapers inwardly toward the panel board. Each part 7a has a smooth external surface and when joined together contains an orifice 8 through which extends the grounding electrode conductor. The two part sleeve is inserted into an externally threaded fitting 9. The end of the fitting 10 wherein the sleeve is inserted is tapered in accordance with the taper of the sleeve. The fitting is threaded into the panel board to a limited extent because of flange 11 on the fitting which is positioned to be adjacent the outer side of the panel board. A lock nut 12 adjacent the inner side of the panel board secures the fitting to the panel board. To ensure good electrical contact between the clamp and the conductor a large nut 13 is placed over the fitting exteriorly of the panel board. As the nut is turned it compresses the tapered sleeve around the conductor. One advantage of this clamping arrangement over the Kenny Clamp of the patent is that the orifice formed by two part sleeve clamp/connector is large enough to accommodate a full range of wire conductors having a dimension within the range from #8-3/0 AWG (American Wire Gauge) with a two part sleeve having a ½" outer diameter at its inner end when clamped around the conductor. A ¾' two part sleeve comparable to the sleeve described above except for its outer diameter could also be used with a conductor within the range from 4/0 to 250 KCM(1000 Circular Mils) AWG. The conductor is made of copper or aluminum. Another advantage of the present design is simplicity of manufacture. It is easier to make two smooth tapered elements than an externally threaded funnel. An additional advantage is the elimination is of other means of compression as by use of a plier. The conductor passes through the sleeve and ends in the bus bar located within the panel board and as aforementioned secured by a screw.

Both the sleeve elements and the conductor are listed and labeled 110.3(B), NEC and are rated by UL (Underwriter's Laboratory) for the short time test current and also rated for fault current.

The bonding or joining all metal parts of the wiring system such as the grounding electrode conductor, its associated clamp, the grounding electrode, the panel board, or other enclosures ensures good, continuous metallic connections throughout the grounding system. While U.S. Pat. No. 4,496,791 discusses bonding according to the National Electric Code of 1981, the spring member therein that completes the bond is made of carbon steel, whereas the grounding electrode conductor and the associated clamp of U.S. Pat. No. 5,912,434 and this application is made of aluminum, its alloys or copper and its alloys, the acceptable materials of the National Electric Code of 2002; moreover, the spring biased connector of U.S. Pat. No. 4,496,791 is for a pushbutton switch and would not be acceptable for grounding and bonding of electrode conductors used for household, commercial and industrial wiring. Of the three tests used by the Underwriter's Laboratory, the aforesaid prior art patents could pass only the corrosion test.

While this invention has been shown and described in terms of a specific embodiment, it will be obvious to those skilled in the art that various modifications and changes can be made therein without departing from the scope and spirit of the invention.

The invention claimed is:

1. A device for bonding a grounding electrode conductor to (a) the metal enclosure (such as) of an electric service box in conformance to the National Electric Code (of 2002) and the Underwriter's Lab Manual for connectors and grounding equipment comprising:

a) a grounding electrode having a grounding electrode conductor affixed thereto, said conductor extending from said grounding electrode to said enclosure, b) said enclosure having an inlet to which a metal sleeve connector assembly can be affixed, said conductor having an aperture thereat for receiving said conductor and including a two part tapered sleeve having a smooth external surface, each said part being separate and detached before assembly, a threaded fitting having one end tapered in conformance with the taper of the sleeve, a nut inserted thereover, said nut compressing said fitting and said sleeve with a minimum torque of 150 inch pounds around said conductor as it is rotated toward said service box, said fitting and said sleeve being in electrical contact with said conductor, c) a flange integral with the fitting and located adjacent an outer side of said enclosure, said fitting's extending into said enclosure being limited by said flange, said conductor assembly being secured to said enclosure by a lock nut, said conductor having an end that passes through said aperture in said sleeve and being fastened to a bus bar in said enclosure, d) said press sleeve connector assembly and said conductor being rated for a minimum of short time test current and fault current.

2. A device as in claim 1 wherein said connector assembly and said conductor are made of aluminum or aluminum alloy.

3. A device as in claim 1 wherein said connector assembly and said conductor are made of copper or copper alloy.

4. A device as in claim 1 wherein said connector assembly and said conductor are adapted for a household, commercial, or industrial wiring system.

5. A device as in claim 1 wherein said two part sleeve when assembled has an outer diameter at its inner end and an orifice large enough to accommodate a range of wire conductors having a dimension within the range of(#8-30 AWG)#8-3/0 AWG, c) a flange integral with the fitting and located adjacent an outer side of said metal enclosure, said fitting's extending into said enclosure being limited by said flange, said connector assembly being secured to said enclosure by a lock nut, said conductor having an end that passes through said aperturre in said sleeve and being fastened to a bus bar in said enclosure, d) said press sleeve connector assembly and said conductor being rated for a minimum of short test current and available fault current.

6. A device as in claim 1 wherein said two part sleeve when assembled has an outer diameter of about ¾" at its inner end and an orifice large enought to accommodate a range of wire conductors having a dimension within the range of 4/0 to 250 KCM AWG.

* * * * *